United States Patent
Maheshwari et al.

(10) Patent No.: US 10,430,167 B2
(45) Date of Patent: Oct. 1, 2019

(54) REDISTRIBUTION OF DATA PROCESSING TASKS

(71) Applicant: SAP SE, Walldorf (DE)

(72) Inventors: Nitesh Maheshwari, San Francisco, CA (US); Shahul Hameed P., San Francisco, CA (US); Sven Lehmann, Berlin (DE); Sinisa Knezevic, San Francisco, CA (US); Haolun Yan, San Francisco, CA (US)

(73) Assignee: SAP SE, Walldorf (DE)

( * ) Notice: Subject to any disclaimer, the term of this patent is extended or adjusted under 35 U.S.C. 154(b) by 267 days.

(21) Appl. No.: 15/466,192

(22) Filed: Mar. 22, 2017

(65) Prior Publication Data
US 2018/0275975 A1 Sep. 27, 2018

(51) Int. Cl.
*G06F 16/2455* (2019.01)
*G06F 8/41* (2018.01)
*G06F 9/54* (2006.01)
*G06F 16/25* (2019.01)
*G06F 9/50* (2006.01)

(52) U.S. Cl.
CPC .............. *G06F 8/41* (2013.01); *G06F 9/5066* (2013.01); *G06F 9/546* (2013.01); *G06F 16/24552* (2019.01); *G06F 16/256* (2019.01)

(58) Field of Classification Search
None
See application file for complete search history.

(56) References Cited

U.S. PATENT DOCUMENTS

| | | | | |
|---|---|---|---|---|
| 6,725,213 | B1* | 4/2004 | Chiocca | G06F 16/2438 |
| 2002/0002603 | A1* | 1/2002 | Vange | G06F 9/5027 |
| | | | | 709/219 |
| 2002/0059259 | A1* | 5/2002 | Cotner | G06F 16/2443 |
| 2004/0162822 | A1* | 8/2004 | Papanyan | G06F 16/2453 |
| 2007/0061375 | A1* | 3/2007 | Brown | G06F 16/27 |
| 2007/0239797 | A1* | 10/2007 | Cattell | G06F 16/217 |
| 2011/0225121 | A1* | 9/2011 | Cooper | G06F 16/273 |
| | | | | 707/634 |
| 2011/0246425 | A1* | 10/2011 | Munoz | G06F 11/1458 |
| | | | | 707/640 |
| 2014/0279944 | A1* | 9/2014 | Ghandeharizadeh | |
| | | | | G06F 16/2365 |
| | | | | 707/690 |
| 2014/0310232 | A1* | 10/2014 | Plattner | G06F 16/24539 |
| | | | | 707/602 |
| 2016/0012108 | A1* | 1/2016 | Hu | G06F 16/24532 |
| | | | | 707/771 |
| 2017/0039227 | A1* | 2/2017 | Herbst | G06F 16/219 |
| 2017/0177685 | A1* | 6/2017 | Becker | G06F 16/27 |

* cited by examiner

*Primary Examiner* — Philip Wang
(74) *Attorney, Agent, or Firm* — Sterne, Kessler, Goldstein & Fox P.L.L.C.

(57) ABSTRACT

Disclosed herein are system, method, and computer program product embodiments for a data processing redistribution system. An embodiment operates by an in-memory database, that includes a portion of data from a remote database, receiving a request to perform a procedure on a portion of data of the remote. A remote processor having access to the portion of data is identified to execute the procedure. The result data is then received from the remote processor and provided to an application responsive to the request.

20 Claims, 4 Drawing Sheets

REDISTRIBUTION OF DATA PROCESSING TASKS

BACKGROUND

The speed of processing requests is an important optimization target of data processing systems. However, the processing speed may vary based on how or where the data is being stored. For example, data can be stored in a variety of different locations in a given system, including in memory databases or disk storage databases. Data stored in memory may be retrieved and processed faster as compared to the data stored on disk, but memory based storage solutions may be some order of magnitude expensive when compared to disk based solutions. Processing requests for data that is stored on disk storage involves retrieving the data from the disk storage, processing the data in memory, and then returning the result to the requester. However, performing data processing in such a manner consumes the valuable processing capabilities of the in memory database and forces other requests to wait while the data is retrieved and processed, creating a backlog and reducing both the overall processing speed and the capabilities of the entire system.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a redistribution of data processing tasks.

Figure 1:
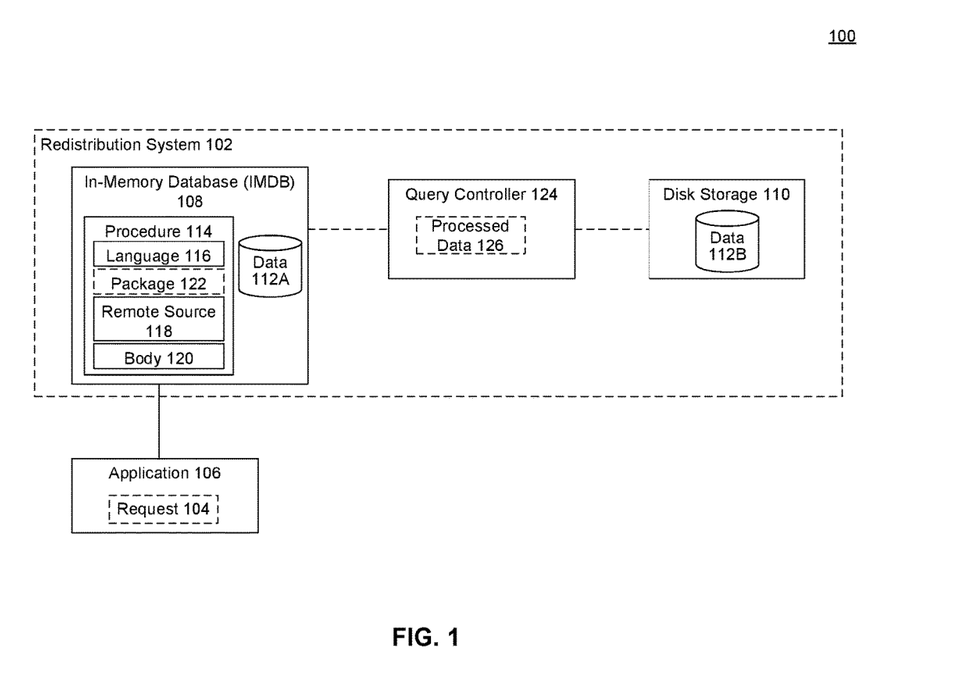
FIG. 1 is a block diagram showing example operations of a data processing redistribution system according to some embodiments.

FIG. 1 is a block diagram showing example operations of a data processing redistribution system 102 according to some embodiments. Redistribution system 102 may receive a request 104 from an application 106. Request 104 may be a request for data 112 stored in or accessible by redistribution system 102, or a combination of both. Request 104 may include a command to perform one or more operations on the retrieved data before returning it to application 106. In an embodiment, request 104 may be a query that requests particular data that meets certain criteria or that is formatted or sorted in a particular way.

Application 106 may be any system or user application that requests, processes, or displays data from redistribution system 102. Example applications 106 may include, for example, a stock trading or other financial tracking application, a human resources application, a web interface, an app on a mobile phone, or a customer resources management (CRM) program. In an embodiment, multiple applications 106 may be requesting data in parallel from an in-memory database (IMDB) 108 of redistribution system 102. Applications 106 may be operating from mobile phones, laptop computers, or other processing devices. Application 106 may interact with and transmit requests 104 to an in-memory database (IMDB) 108 of redistribution system 102. IMDB 108 may be an in-memory database that stores at least a portion of the overall data 112A of redistribution system 102 in a memory structure. IMDB 108 may be able to communicate with a disk storage 110 which may store the remaining data 112B. In an embodiment, disk storage 110 may be a storage system (e.g., such as but limited to a disk storage database, but include a flat or log file) that stores data 112B in another location or may be distributed across one or more processors or machines remote from IMDB 108.

In an embodiment, these different types of storages may have different capabilities. For example, while IMDB 108 may provide faster access to data relative to disk storage 110, disk storage 110 may allow for a greater and/or cheaper storage capability of more data relative to IMDB 108. Redistribution system 102 may utilize both IMDB 108 and disk storage 110 for data processing as described herein. In an embodiment, data 112 as requested (104) by one or more applications 106 may be stored on either or both IMDB 108 as data 112A and disk storage 110 as data 112B. Based on the contents of request 104, redistribution system 102 may determine how to process each request 104, depending at least in part where the requested data is stored. In an embodiment, in response to various requests 104 or other factors, data 112 may be swapped between or moved across IMDB 108 and disk storage 110, such that a recently processed, accessed, or otherwise higher priority data 112A may be stored on IMDB 108 while less frequently accessed, legacy, or lower priority data 112B may be stored or backed up on disk storage 110.

In an embodiment, disk storage 110 may be a master or remote database that provides or stores data in a disk (or another type of) storage that is periodically accessed by IMDB 108. For example, IMDB 108 may occasionally retrieve data 112B from disk storage 110 that is requested (104) by one or more applications 106. Or, for example, IMDB 108 may communicate or transmit updated data 112A back to disk storage 112B for storage, computational, or back up purposes. In an embodiment, disk storage 110 may be a flat file or collection of files not formally arranged into a database structure. In an embodiment, disk storage 110 may include a collection of machines across which structured or unstructured data 112 may be distributed.

Upon receiving request 104, redistribution system 102 may determine whether the referenced or requested data is stored on IMDB 108 or disk storage 110. In an embodiment, request 104 may be received by IMDB 108 which may determine whether or not the data associated with the request is stored on a local processor associated with IMDB 108. If so, IMDB 108 may process whatever operations are to be performed on data 112. For example, depending on the operations to be performed, IMBD 108 may request or retrieve data 112B from disk storage 110 and/or transfer data 112A from IMDB 108 to disk storage 110. IMDB 108 may then return the result of the operation(s) to application 106.

Alternatively, IMDB 108 may determine that the data of request 104 is not stored locally on IMDB 108, and instead is stored on disk storage 110 as data 112B. IMDB 108 may request or retrieve data 112B from disk storage 110, perform the operations of request 104 on data 112B, and then return a result to application 106. However, to request and process data 112 locally at IMDB 108 would consume valuable and expensive processing cycles of one or more processors of IMDB 108. This would then prevent IMDB 108 from using those processing cycles to process other pending and incoming requests 104 from applications 106, causing backups and processing delays at IMDB 108 and across one or more applications 106.

Rather than request and perform operations locally, IMDB 108 may process request 104 and provide the processed request as procedure 114 to a query controller 124 which may organize and handle the retrieving and processing of the data request 104. Then upon completion of the processing request, query controller 124 may provide or make available the processed data 126 to IMDB 108 which may then return processed data 126 to the requesting application 106. This frees up the processing capabilities of IMDB 108 to continue to process other incoming and pending requests 104, thus increasing the speed of the overall system 102.

In an embodiment, request 104 may be associated with or include a call to a procedure 114. This reference to procedure 114 may be processed by IMDB 108 as a virtual procedure call. IMDB 108 may process the virtual procedure call and provide the corresponding procedure 114 to query controller 124 for further processing (such as a compiling procedure 114, retrieving data 112B from disk storage 110, and executing or managing the execution of the operations of procedure 114 across one or more nodes or processors).

Request 104 may include parameters that define procedure 114. Procedure 114 may be a function or call to a previously used, written, or compiled program that may be used to process data 112. For example, the call in request 104 may include a name of procedure 114, and the code or body 120 to be executed (or a location thereof where the code is stored or may be located). The call may also include parameters that identify a programming language 116, a remote source 118, and one or more packages 122 or libraries related to the execution of body 120. An example procedure call (as may be included in request 104 or otherwise processed by IMDB 108) or procedure creation syntax is provided below.

```
CREATE VIRTUAL PROCEDURE <proc_name>
[(<parameter_clause>)]
     [SQL SECURITY <mode>]
     [[<package_clause>] LANGUAGE <lang>]
     [CONFIGURATION <remote_proc_properties>]
     AT <source_name>
  [AS
  {BEGIN
     <procedure_body>
  END}]
```

The procedure name clause may provide a name for procedure 114. The parameter clause may include one or more parameters as just noted, including (but not limited to) parameters for language 116, remote source 118, procedure body 120, and one or more packages or libraries 122. In an embodiment, these parameters may be either input or output parameters, and either be table valued or scalar valued. Request 104 may use of the parameters to specify the input and output data for procedure 114. Using the provided parameters and procedure body, IMDB 108 may assemble the virtual procedure, and may provide the procedure 114 to query controller 124 for processing. Language 116 may indicate which programming language is used in the code of body 120. Redistribution system 102 may enable the execution of code written in any different number of programming languages against data 112. While request 104 may include various code elements written in any number of different embodiments of structured query language (SQL); language 116 may indicate another non-SQL programming language used for body 120. Example languages 116 include Java®, C++, Javascript®, Scala, or Python.

Package 122 may be one or more libraries or programs which are accessed within body 120 to execute one or more operations on data. For example, body 120 may make reference to one or more programming libraries that are being accessed to perform operations on data 112B. An example library in Java® may include a .JAR file.

IMDB 108 allows request 104 to leverage the use of pre-compiled libraries or programs which not only expands the capabilities of redistribution system 102 without the introduction of additional business logic or hardware (by not limiting processing to SQL and SQL libraries). By allowing for packages 122 to be processed, redistribution system 102 also reduces the likelihood of errors that could be introduced by copying or having rewrite code and increasing processing speed by not having to error check, parse, or compile the libraries or other code that may have been previously checked, parsed, and/or compiled.

Procedure 114 may include a parameter indicating or identifying a remote source 118. Remote source 118 may indicate one or more processors (such as query controller 124) where the procedure body 120 is to be executed. As noted earlier, while IMDB 108 may be able to execute the operations of procedure 114, to do so would consume the valuable (and limited) processing cycles on IMDB 108 which would otherwise prevent or delay the handling of other requests 104 from one or more other applications 106. As such, redistribution system 102 utilizes all the resources and processors available to process requests 104, including for example, query controller 124.

Based on remote source 118, redistribution system 102 may identify one or more available query controllers 124 that may compile and execute procedure 114 based on remote source parameter 118. As such, when procedure 114 is assembled or verified, procedure 114 (e.g., body 120 and packages 122) may be provided to the query controller 124 indicated by remote source 118. In an embodiment, redistribution system 102 may have multiple possible query controllers 124 which may be available, and may select one to process procedure 114 using remote source 118. Correspondingly, within IMDB 108, the execution of request 104 may be paused or put on hold until a response is received from query controller 124 indicated that processed data 126 is received or otherwise available to be retrieved. Redistribution system 102 enables synchronization between IMDB 108 and the processing of procedure 114 of request 104 on one or more other processors (e.g., query controller 124).

Query controller 124 may include one or more processors that have access to disk storage 110. Query controller may be equipped to compile, process, and execute procedures written in programming language 116. In an embodiment, IMDB 108 may provide body 120 and package 122 to query controller 124. Query controller 124 may compile body 120 using packages 122. In an embodiment, query controller 124 may manage the retrieval of data 112B and execution of procedure 114 across one or more nodes, thus further improving the overall speed of processing of redistribution system 102.

As noted above, query controller 124 may compile procedure 114. In an embodiment query controller 124 may be a master node and may have access to one or more slave nodes. As such, query controller 124 may assign different functions to the slave nodes. The functions may include retrieving data 112B from disk storage 110 and executing one or more portions of procedure 114 against the retrieved data. Then, for example, query processor may assemble the results into processed data 126. Processed data 126 may include the result of request 104. In an embodiment, processed data 126 may include an assembled version of the processed data from one or more slave nodes. Or, for example, processed data 126 may include an indication of where the processed data is stored. For example, after being processed, the slave nodes may provide to query controller 124 an indication that processing has been completed, and where the processed data (on which node) is being stored. Then, for example, when query controller 124 has received an indication from the different slave nodes that procedure 114 has completed processing, query controller 124 may provide an indication to IMDB 108.

IMDB 108 may then retrieve processed data 126, and then complete the processing of request 104 by providing or otherwise making available processed data 126 to application 106.

Figure 2:
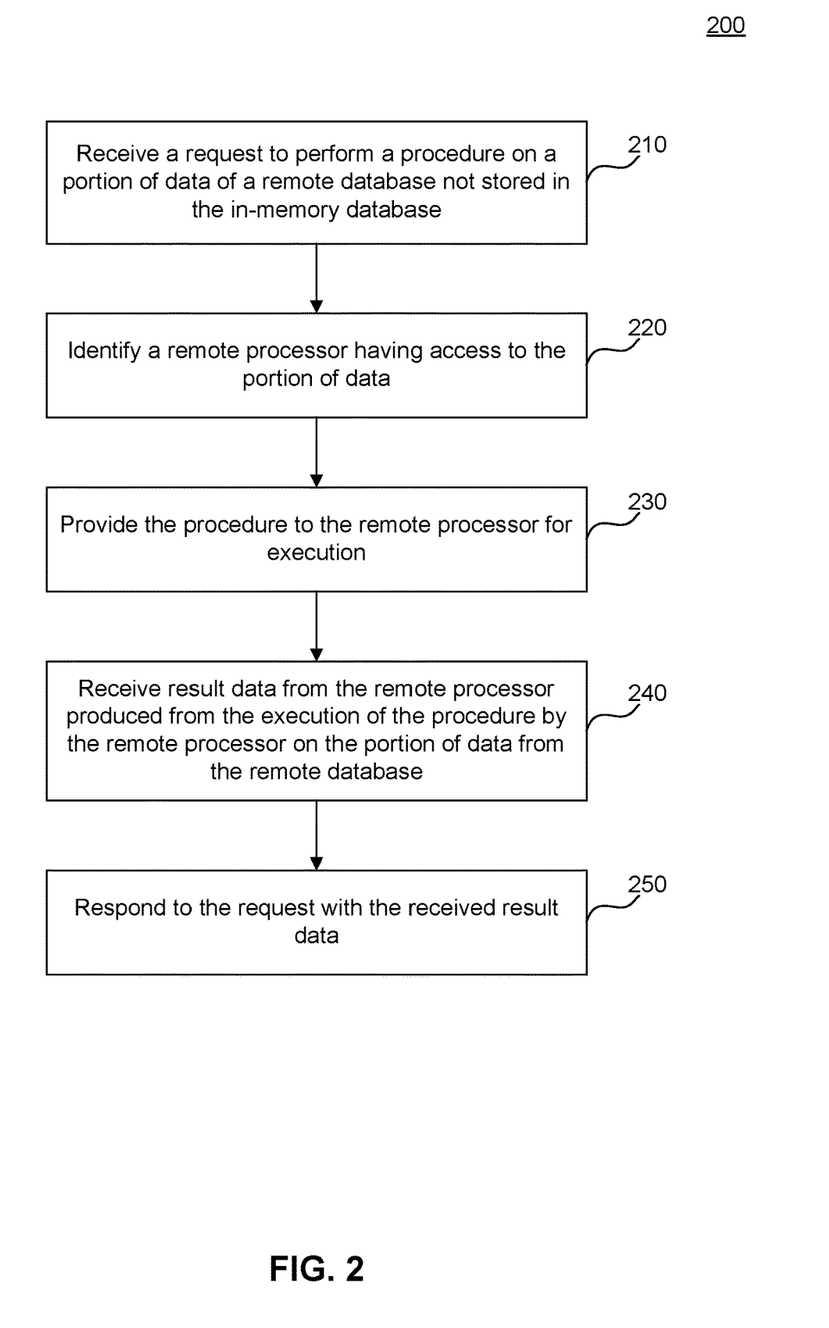
FIG. 2 is a flowchart for a method 200 for a data processing redistribution system, according to some embodiments.

FIG. 2 is a flowchart showing example operations of a data processing redistribution system 102, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At 210, a request to perform a procedure on a portion of data of a master database not stored in the in-memory database is received. For example, IMDB 108 may receive request 104. IMDB 108 may determine that request 104 corresponds to data 112B that is not stored on IMBD 108, but instead is stored on disk storage 110. For example, query controller 124, using remote source 118, may retrieve, access, or perform one or more procedures on the data. In an embodiment, request 104 may request data 112A and data 112B. In an embodiment, disk storage 110 may be an enterprise, master, or remote database, and one or more IMDBs 108 may have access to the data of disk storage 110.

At 220, a remote processor having access to the portion of data is identified. For example, rather than retrieving data 112B and executing operations on IMDB 108, IMDB 108 may provide request 104 to query controller 124. Query controller 124 may be another processor (or group of processors) that have access to disk storage 110 and may retrieve and perform operations on data 112B. In an embodiment, query controller 124 may transfer part of data 112A from IMDB 108 to disk storage 110 to perform operations on data 112A and 112B together. While query controller 124 manages the execution of the operations, IMDB 108 may continue in parallel processing other requests 104.

At 230, the procedure is provided to the remote processor. For example, IMDB 108 may provide language 116, package 122, and body 120 to a query controller 124 specified by remote source 118. Rather than limiting request 104 to a database query language such as structured query language (SQL), procedure 114 may enable request 104 to include operations that have been written into one or more other programming languages, including, but not limited to SQL such as Scala, Python, or Java, as may be designated by language 116. In an embodiment, request 104 may include or require both SQL and non-SQL procedures for execution. For example, rather than stalling other tasks (e.g., request 104) or consuming local processing cycles to retrieve data 112B and execute procedure 114 associated with request 104, IMDB 108 may provide procedure 114 to query controller 124 to manage the execution thereof (e.g., either locally on query controller 124 or via one or more nodes).

In an embodiment, the received procedure 114 may be compiled by a remote processor when the procedure is received for the first time. This compilation may occur prior to execution. For example, query controller 124 may compile the procedure body 120 written in a programming language 116 and store the compiled procedure ready for execution. For subsequent procedure requests (after the first or initial procedure request), this compilation step may be skipped and the procedure is directly executed using the compiled procedure.

At 240, result data is received from the remote processor. For example, the compiled procedure may be executed using the input data received as part of request 104 and result data may be computed based on the procedure logic specified in the procedure body 120. In an embodiment, IMDB 108 may receive a notification that processed data 126 is available for retrieval or may otherwise receive processed data 126 from query controller 124. Processed data 126 may include data 112B retrieved from disk storage 110, processed or executed in accordance with body 120 of procedure 114, and made available to IMDB 108 having been stored across one or more storage nodes. In an embodiment, the nodes that execute and/or store result data may access and store data from disk storage 110, but may also operate independently from disk storage 110. This may enable disk storage 110 to continue to process additional requests while data 112B is being retrieved and/or processed by the nodes. In an embodiment, IMDB 108 may have paused the processing of request 104 at IMDB 108, and upon receiving the notification, IMDB 108 may resume the processing of request 104 by retrieving processed data 126.

At 250, the received result data is provided responsive to the request. For example, IMDB 108 may provide or otherwise make available processed data 126 to application 106 responsive to request 104.

Figure 3:
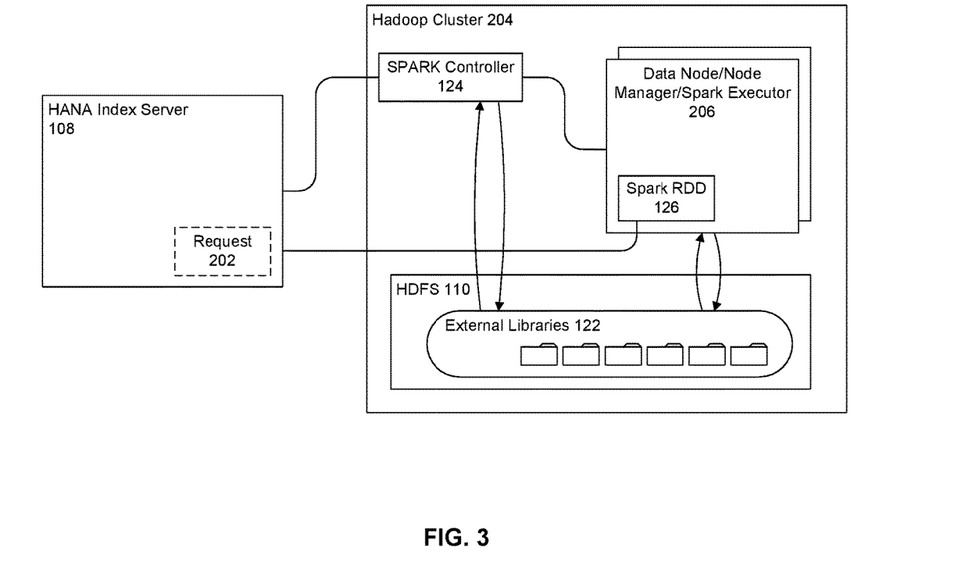
FIG. 3 is block diagram showing example operations of data processing redistribution system according to some embodiments.

FIG. 3 is block diagram showing example operations of data processing redistribution system 102 according to some embodiments. FIG. 3 shows another example embodiment of a data processing redistribution system 102.

In an embodiment, the IMDB 108 may be a HANA index server 108. HANA is an example of an in-memory, column oriented, relational database system, which may be used to store and retrieve data requested by applications. HANA may be deployable in a cloud computing environment across one or more processors.

Upon receiving and parsing a request from an application, and determining that the requested data is not locally stored in the HANA environment, HANA index server 108 may send a processing request 202 to a SPARK controller 124 inside of a Hadoop cluster 204. Processing request 202 may include one or more elements of procedure 114 described above.

Hadoop cluster 204 may be a computational environment or cluster of computers or processors designed for storing and analyzing large amounts of structured or unstructured data in a distributed computing environment. SPARK controller 124 may receive processing requests 202 from HANA index server 108 and determine how to compile and execute the SQL and other programming operations (e.g., procedure 114) within the Hadoop cluster 204. For example, the procedure body 120 may be written in another programming language.

SPARK controller 124 may, for example, retrieve or access identified packages 122 in the Hadoop distributed file system (HDFS) 110, which may include a framework for storing and retrieving large amounts of structured or unstructured data, including libraries 122. SPARK controller 124 may compile the received procedure 114 with the retrieved external libraries 122, and provide or assign the compiled code to one or more nodes 206 for execution (e.g., such as SPARK executor nodes).

Nodes 206 may retrieve the data (112B) and access the libraries (packages) 122 from HDFS 110, and execute the compiled code against the data to produce the processed data or Spark RDD (resilient distributed dataset) 126. Spark RDD 126 may then be provided or otherwise made available to the HANA index server 108 which may return data from Spark RDD 126 in response to one or more queries from one or more applications 106.

Figure 4:
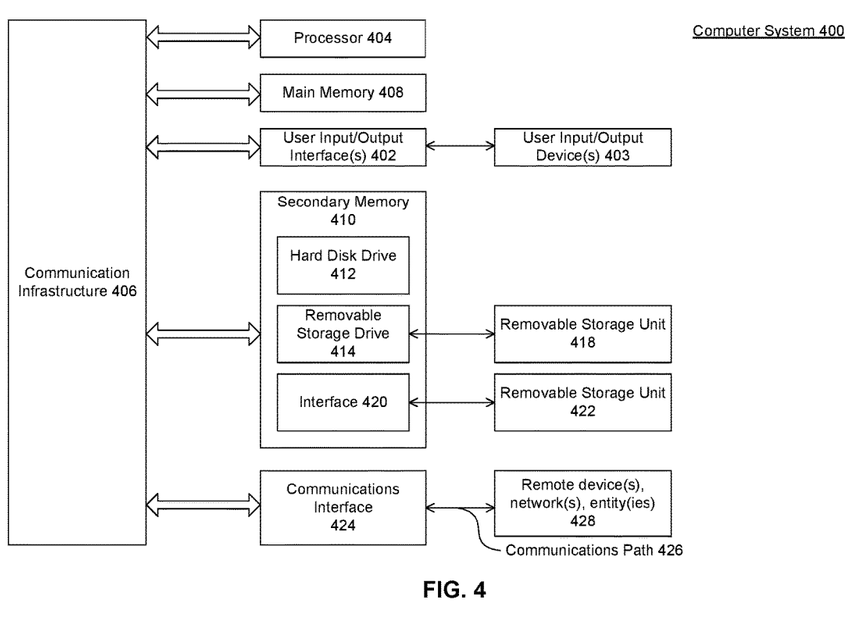
FIG. 4 is an example computer system useful for implementing various embodiments.

Various embodiments can be implemented, for example, using one or more computer systems, such as computer system 400 shown in FIG. 4. Computer system 400 can be used, for example, to implement the systems of FIG. 1 or 3, and/or the methods of FIG. 2. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   receiving, at an in-memory database comprising data from a remote database, a request to perform a procedure on a portion of data of the remote database, wherein the portion of data is not stored in the in-memory database, and wherein the procedure includes a parameter that indicates a remote source:
   identifying a remote processor corresponding to the remote source and having access to the portion of data;
   providing the procedure to the remote processor for execution, wherein the procedure is defined in a language other than a database query language;
   receiving result data from the remote processor, wherein the result data is produced from the execution of the procedure by the remote processor on the portion of data from the remote database, and
   responding to the request with the received result data.

2. The method of claim 1, wherein the receiving the data comprises:
   receiving a notification that the procedure comprising one or more operations have completed, wherein the notification identifies one or more nodes where the data is stored, and wherein the one or more nodes are independent of the remote database; and
   retrieving the stored data from the one or more nodes.

3. The method of claim 1, wherein the request is received from an application that is interfacing with the in-memory database and wherein the received data is retrieved from a disk storage of the remote database and provided to the application responsive to the request.

4. The method of claim 1, wherein the identifying comprises:
   identifying a disk-storage data structure including the data, wherein the remote processor has access to the disk-storage data structure.

5. The method of claim 1, wherein the providing the procedure comprises:
   determining that the procedure accesses one or more libraries associated with the programming language; and
   providing the one or more libraries to the remote processor.

6. The method of claim 1, wherein the providing comprises:
   determining that the request includes both the provided procedure written in the language other than the database query language, and another procedure written in the database query language, wherein the remote processor is configured to compile the code written in the other language.

7. The method of claim 1, wherein an execution of the procedure requires a plurality of computing cycles of the remote processor, and wherein the in-memory database performs one or more other operations in parallel with the compilation and execution of one or more operations of the procedure on the remote processor.

8. The method of claim 7, wherein the in-memory database locally pauses a processing of the request until the in-memory database receives the result data from the remote processor.

9. The method of claim 8, wherein the remote processor compiles the procedure and provides an executable version of the procedure to one or more nodes independent of the remote database for execution.

10. A system, comprising:
    a memory; and
    at least one processor of an in-memory database coupled to the memory and configured to:
      receive, at the in-memory database comprising data from a remote database, a request to perform a procedure on a portion of data of the remote database, wherein the portion of data is not stored in the in-memory database, and wherein the procedure includes a parameter that indicates a remote source;
      identify a remote processor corresponding to the remote source and having access to the portion of data;
      provide the procedure to the remote processor for execution, wherein the procedure is in a language other than a database query language;
      receive result data from the remote processor, wherein the result data is produced from the execution of the procedure by the remote processor on the portion of data from the remote database; and
      respond to the request with the received result data.

11. The system of claim 10, wherein the at least one processor configured to receive the data is configured to:
    receive a notification that the procedure comprising one or more operations have completed, wherein the notification identifies one or more nodes where the data is stored, and wherein the one or more nodes are independent of the remote database; and
    retrieve the stored data from the one or more nodes.

12. The system of claim 10, wherein the request is received from an application that is interfacing with the in-memory database and wherein the received data is retrieved from a disk storage of the remote database and provided to the application responsive to the request.

13. The system of claim 10, wherein the processor configured to identify is configured to:
    identify a disk-storage data structure including the data, wherein the remote processor has access to the disk-storage data structure.

14. The system of claim 10, wherein the processor configured to provide is configured to:
    determine that the procedure accesses one or more libraries associated with the programming language; and
    provide the one or more libraries to the remote processor.

15. The system of claim 10, wherein the processor configured to provide is configured to:
    determine that the request includes both the provided procedure written in the language other than the database query language, and another procedure written in the database query language, wherein the remote processor is configured to compile the code written in the other language.

16. The system of claim 10, wherein an execution of the procedure requires a plurality of computing cycles of the remote processor, and wherein the in-memory database performs one or more other operations in parallel with the compilation and execution of one or more operations of the procedure on the remote processor.

17. The system of claim 16, wherein the in-memory database locally pauses a processing of the request until the in-memory database receives the result data from the remote processor.

18. The system of claim 17, wherein the remote processor compiles the procedure and provides an executable version of the procedure to one or more nodes independent of the remote database for execution.

19. A non-transitory computer-readable device having instructions stored thereon that, when executed by at least one computing device, causes the at least one computing device to perform operations comprising:
    receiving, at an in-memory database comprising data from a remote database, a request to perform a procedure on a portion of data of the remote database, wherein the portion of data is not stored in the in-memory database, and wherein the procedure includes a parameter that indicates a remote source:
    identifying a remote processor corresponding to the remote source and having access to the portion of data,
    providing the procedure to the remote processor for execution, wherein the procedure is in a language other than a database query language; compiling the procedure at the remote processor; executing the compiled procedure;
    receiving result data from the remote processor based on the executed procedure, wherein the result data is produced from the execution of the procedure by the remote processor on the portion of data from the remote database; and
    responding to the request with the received result data.

20. The device of claim 19, wherein an execution of the procedure requires a plurality of computing cycles of the remote processor, and wherein the in-memory database performs one or more other operations in parallel with the compilation and execution of one or more operations of the procedure on the remote processor.

* * * * *